C. W. ZIMMERMAN.
TIRE DEFLATION INDICATOR.
APPLICATION FILED MAR. 9, 1920.
1,398,992.
Patented Dec. 6, 1921.
2 SHEETS—SHEET 2.
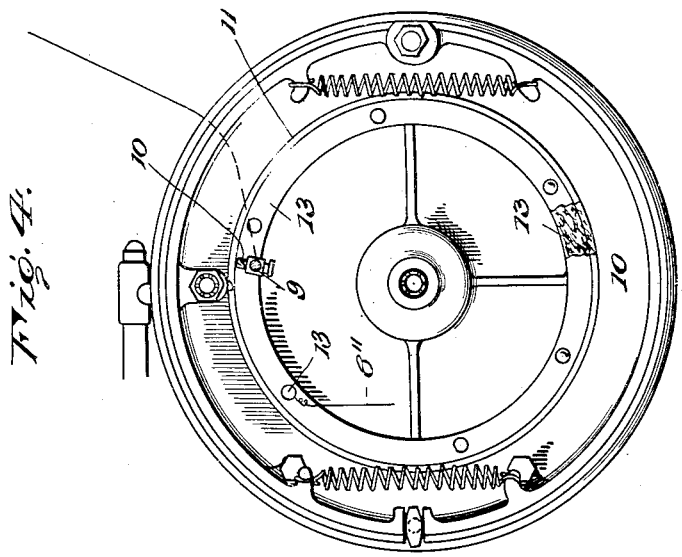
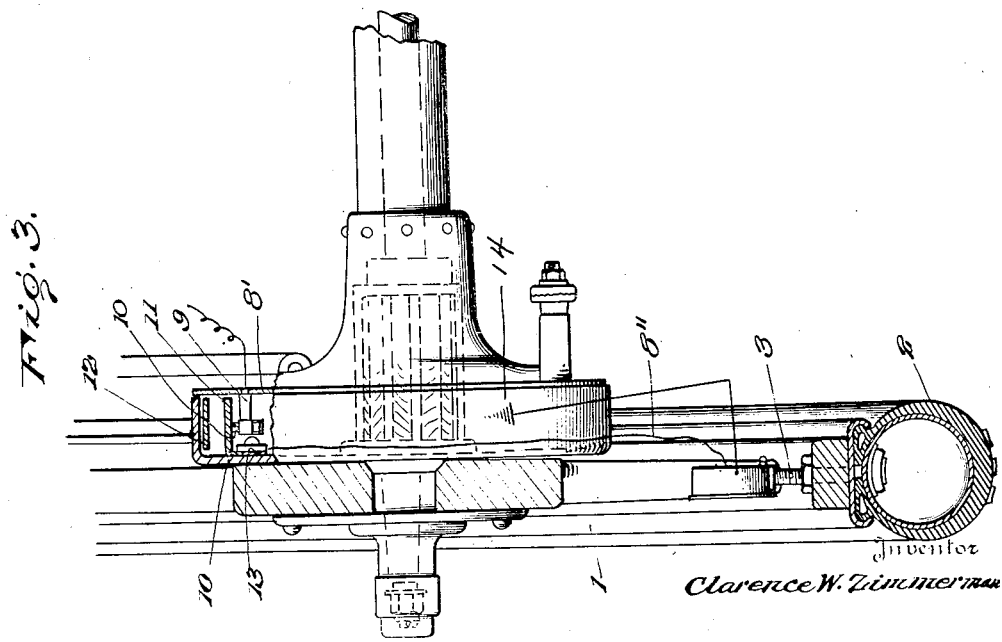

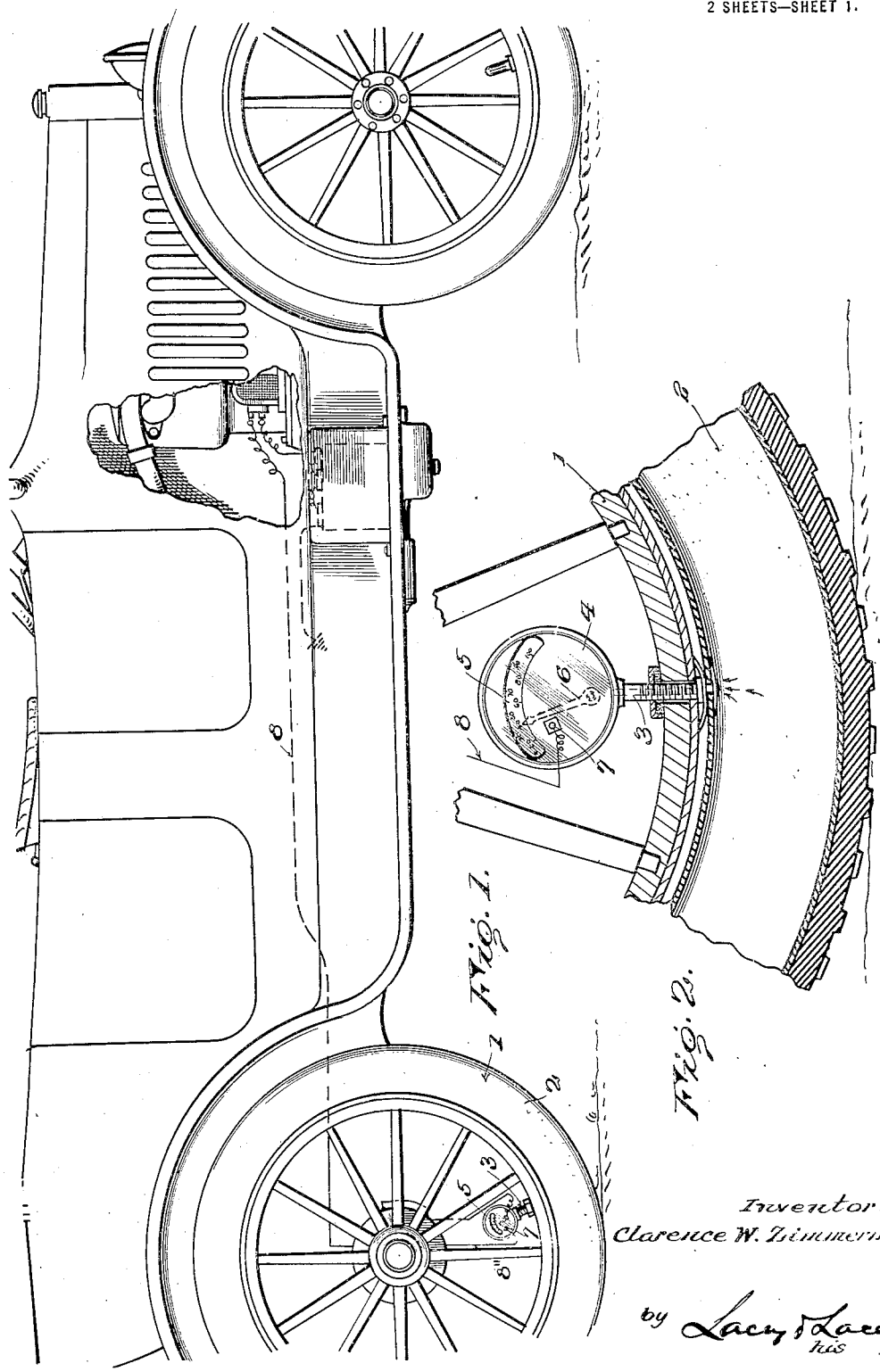

UNITED STATES PATENT OFFICE.

CLARENCE W. ZIMMERMAN, OF VENANGO, NEBRASKA, ASSIGNOR OF ONE-HALF TO JAMES M. FULTON, OF HOLYOKE, COLORADO.

TIRE-DEFLATION INDICATOR.

1,398,992.　　　　Specification of Letters Patent.　　Patented Dec. 6, 1921.

Application filed March 9, 1920. Serial No. 364,473.

*To all whom it may concern:*

Be it known that I, CLARENCE W. ZIMMERMAN, a citizen of the United States, residing at Venango, in the county of Perkins and State of Nebraska, have invented certain new and useful Improvements in Tire-Deflation Indicators, of which the following is a specification.

This invention relates to a tire deflation indicator for apprising the driver of a motor vehicle when the pressure in the tire drops below a predetermined point.

With the usual form of tire valve used in pneumatic tires there is no way of indicating to the driver of the vehicle carrying such tires that the pressure in said tire or tires has become so low as to work injury to the tire if the vehicle is driven further; as a consequence, many tires are ruined by being driven flat or partially deflated before being discovered.

An object of the present invention resides in the provision of a device which will warn the driver of a deflated tire by reason of the fact that the motor power of the vehicle is cut off when such a condition exists, thereby preventing further operation until the device giving this warning is either removed or the condition remedied.

A further object of the invention resides in associating a pressure indicator of the visible indicating type with a tire valve of the usual Schraeder construction in which a plunger valve is depressed for admission or emission of the inflating fluid, such pressure gage being so constructed that when the indicating member thereof moves to a predetermined low pressure point a circuit will be closed to interrupt the ignition in the engine cylinders of a motor vehicle.

In the drawings:

Figure 1 is a side elevation of a motor vehicle equipped with the invention.

Fig. 2 is a detail view, in side elevation, showing the associated pressure gage and tire valve;

Fig. 3 is a vertival transverse section, partly in elevation as to the axle parts, showing the circuit closing means for the revolving parts of the axle construction;

Fig. 4 is an elevational view of the brake drum and closing cover with the brush mechanism in side elevation.

In detail:

The invention, as herein shown, is embodied in a pleasure vehicle, but it is equally applicable to commercial vehicles such as trucks which are rapidly coming to the use of pneumatic tires.

Also, the invention, as shown herein, is applied to rear wheel construction but is equally adaptable to front wheel construction when the necessary inconsequential modifications are made.

The rear wheel of the vehicle is indicated at 1 and carries a pneumatic tire 2 having the usual Schraeder valve 3. Any standard form of tire pressure gage is connected with the valve 3 and is provided with an indicating scale 5 and a pointer 6, said pressure gage being generally indicated by the numeral 4. Fixed to the dial carrying the scale 5 and disposed with respect thereto at a predetermined low pressure point is a contact member 7. The pointer 6 may move into contact with said contact 7.

The primary wire 8 leading from the ignition coil of the vehicle is connected with the brake drum spider 8'. Said brake drum spider 8' carries a brush holder 9 insulated from the brake drum spider and having a tension brush 10 maintained in contact with the ring 11 by a suitable spring, said ring 11 being carried by the brake drum but insulated therefrom, as indicated at 13. The wire 8, while attached to the brake drum spider 8', has no electrical connection therewith but electrical connection is established between the said wire 8 and the brush holder 9. A wire 8″ connects with the contact 7 of the pressure gage 4 and also with the ring 11. The brake drum 12 is included in the ground of the vehicle ignition system, the source of electrical energy of such ignition system being suitably grounded at any point on the vehicle chassis.

The pointer 6 of the pressure indicator 4 is grounded on the brake drum in any suitable manner, as indicated at 14. Therefore, when the pressure within the tire tube has fallen to the predetermined point, the said pointer 6 crosses the contact 7 and grounds the primary wire 8 through the medium of the wire 8″ and the said brush 10, thereby cutting out ignition in the cylinders of the vehicle engine whereby the vehicle is immediately stopped and cannot be again operated until the tire conditions have been remedied. In this manner damage to the tires of the vehicle is positively avoided as they cannot be run deflated.

I claim:

The combination with the ignition system of a pneumatic tired motor vehicle, of a brake drum carrying an insulated ring, a brush bearing on said insulated ring and connected with the primary wire of the ignition system, a pressure gage carried by each tire and having a contact connected with the said ring, a pointer embodied in said pressure gage for traversing said contact and grounded on the vehicle whereby traversing of said contact by such pointer interrupts the operation of the ignition system.

In testimony whereof I affix my signature.

CLARENCE W. ZIMMERMAN. [L. S.]